Figure 1:
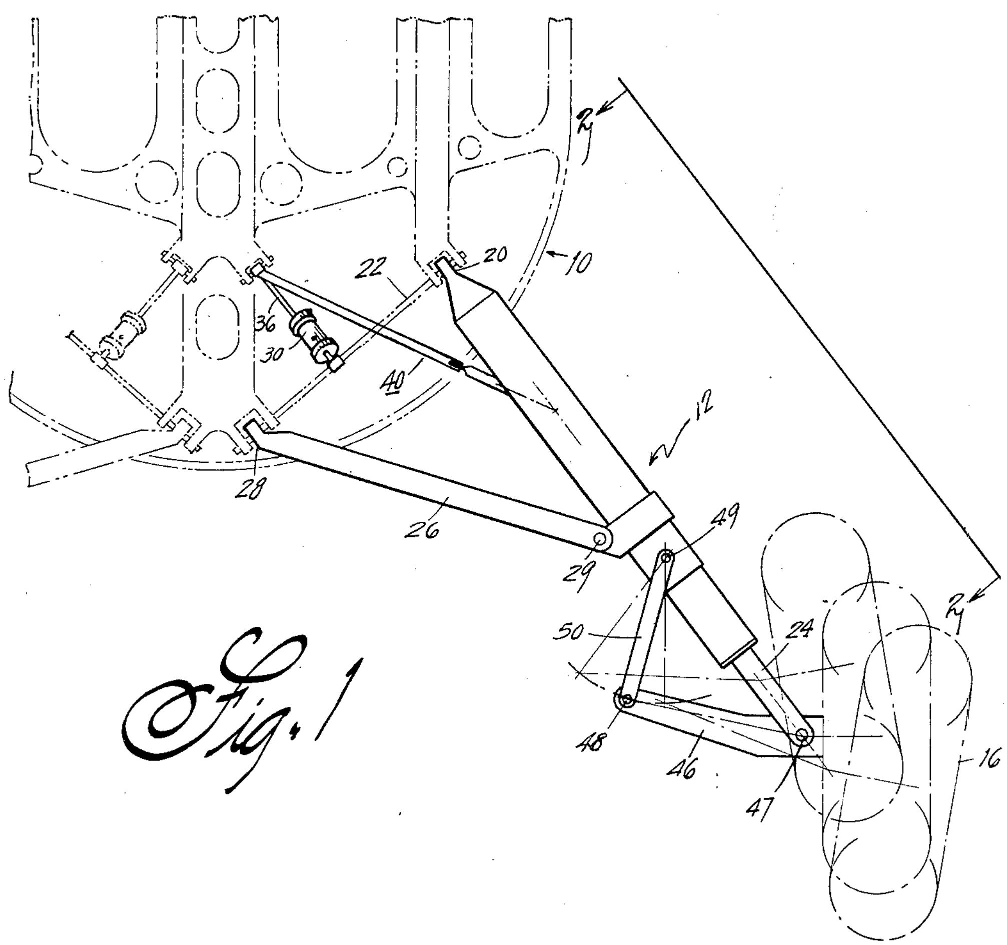

Feb. 18, 1964 E. F. PAXHIA ETAL 3,121,547

LANDING GEAR

Filed Feb. 21, 1962 2 Sheets-Sheet 1

INVENTORS
Emanuel F. Paxhia
BY Roland M. LaPorte

Arthur L. Collins
ATTORNEY

INVENTOR.
Emanuel F. Paxhia
Roland M. LaPorte
BY
Arthur L. Collins
ATTORNEY

United States Patent Office 3,121,547
Patented Feb. 18, 1964

1

3,121,547
LANDING GEAR

Emanuel F. Paxhia, Tonawanda, and Roland M. La Porte, Williamsville, N.Y., assignors, by mesne assignments, to the United States of America as represented by the Secretary of the Navy Filed Feb. 21, 1962, Ser. No. 174,923
4 Claims. (Cl. 244—102)

This invention relates to aircraft landing gear and particularly to those that extend outwardly and downwardly from the fuselage.

To obtain sufficient lateral separation between the landing wheels of an aircraft, a method of mounting is to secure one end of the oleo strut to the fuselage so that the wheel carrying ends extend away and down from the fuselage. The tires on wheels so mounted, however, undergo substantial scuffing during strokes of the oleo strut since it will have both horizontal as well as vertical vectors of travel. It is necessary to eliminate or at least minimize the horizontal vector of travel to protect the tires from scuffing.

It is an object of this invention to provide an improved landing gear adapted to be mounted at an angle to the vertical and offering a minimum of scuffing to the tires.

A further object is to provide a retractable non-scuffing landing gear of simplified construction and thereby of reduced weight.

Still another object of this invention is to provide a retactable non-scuffing landing gear having a design which permits extension and retraction with a single actuator.

Figure 2:
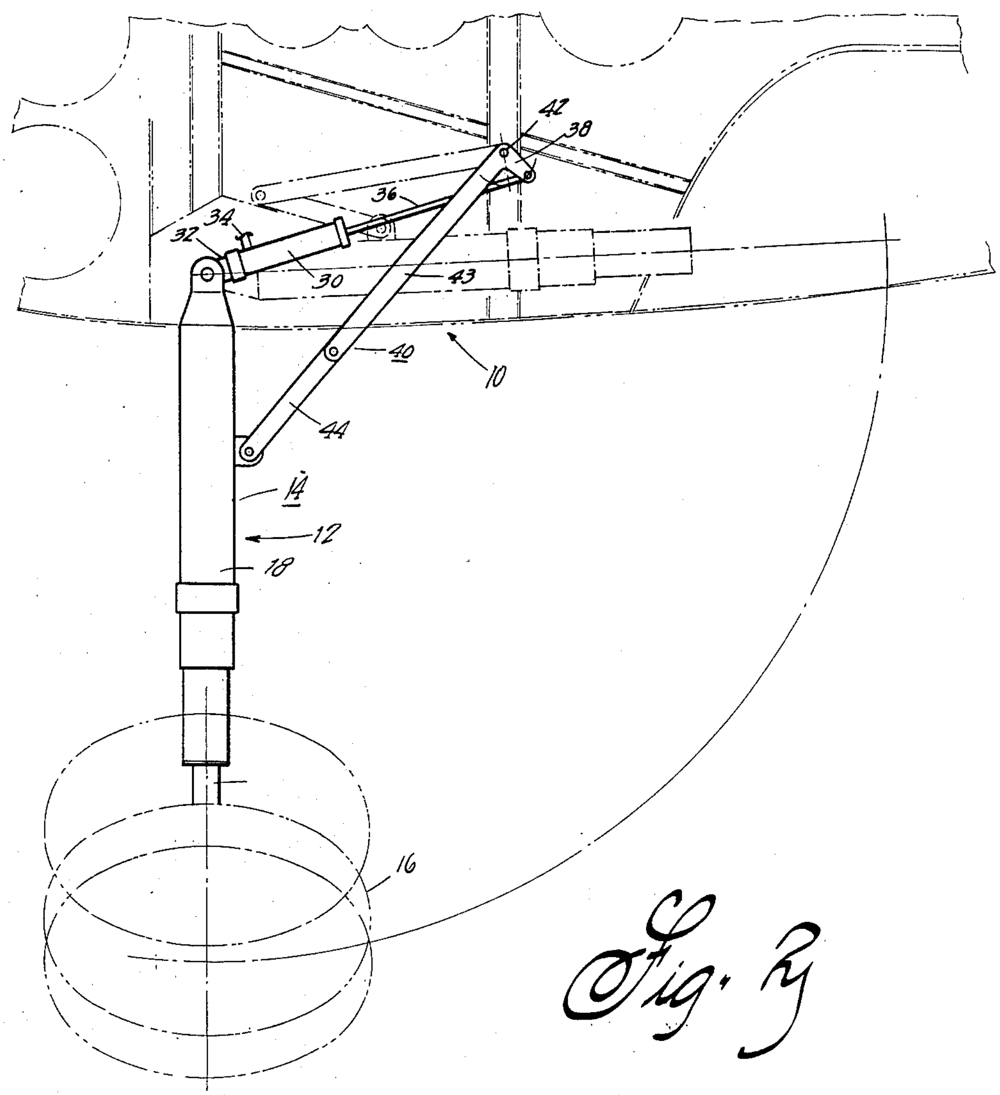

These and other objects and advantages will become apparent from the detailed description when read in conjunction with the drawing in which:

FIG. 1 is a front elevation of a portion of an aircraft showing a landing gear incorporating the invention, and FIG. 2 is a side view taken along the lines 2—2 of FIG. 1 showing the gear extended in solid lines and retracted in broken lines.

In general, the invention provides a laterally disposed axle carrying a landing wheel on its outer end and pivotally connected intermediate its ends to the outer end of a piston rod extending from a shock-absorbing oleo strut. The inboard side of the axle is pivotally connected to a link which is pivotally joined to the oleo strut cylinder. With movement of the oleo strut piston rod, the link and axle move relative each other in scissors fashion. This causes the wheel to roll laterally about the pin joint at the end of the oleo piston rod. At the ground contact point, the wheel rolls somewhat laterally from its tread onto its sidewall instead of sliding laterally over the ground and scuffing the tire tread. The effect is that the lateral roll of the wheel cancels the horizontal travel of the oleo piston.

Referring to the drawing for a more detailed explanation, 10 indicates a portion of an aircraft fuselage having at least a pair of landing gears. One landing gear 12 is shown incorporating the invention.

It includes a shock-absorbing oleo strut 14 which may be extended downwardly and outwardly away from the fuselage during a landing and carries a landing wheel 16 on its free end. Oleo strut 14 has a cylinder 18 closed at its upper end and formed into a clevis 20 by which it is pivotally attached to a fixed shaft 22 mounted at a lateral and upward angle in the fuselage. The lower end of the cylinder is opened and a piston rod 24 of a piston slidably mounted within the cylinder extends from it. The construction within the cylinder is conventional in that it has provision for absorbing the load energy on the landing wheel tending to telescope or extend the oleo strut.

A stabilizing strut 26 with a clevis 28 similar to that on the oleo strut is likewise pivotally mounted on shaft 22 and is secured at its lower end 29 to a mid-point on the outer surface of oleo cylinder 18. It provides bracing for the oleo strut against lateral movement, but pivots about shaft 22 in the axial plane of the fuselage along with the oleo strut during retraction and extension of the landing gear.

2

Between the upper ends of the stabilizing and oleo struts a reverse power actuator 30 is pivotally mounted on shaft 22 at one of its ends 32. It is conventional having a cylinder and piston and is connected to a source of hydraulic fluid by a conduit 34 from an unshown source. The piston is movable in opposite directions under power. The actuator is disposed somewhat along the axis of the fuselage and the outer end of its piston rod 36 is pivotally secured to the dog leg 38 of a cam link, generally indicated at 40, which is L-shaped. Cam link 40 is pivotally connected on a pivot 42 fixed in the fuselage at the junction point of the legs forming the L and has the free end of its long leg 43 pivotally joined to a drag link 44. This is a rod-like member pivotally secured to the outer surface of oleo cylinder 18 above the stabilizing strut connection.

To fully extend the landing gear as in solid lines of FIG. 1 and FIG. 2, the actuator piston is moved outwardly from its cylinder causing the cam link to pivot on pivot 42 until the drag link 44 and leg 43 of the cam link are aligned as extensions of each other. To retract the wheel, the actuator piston is moved inward causing the cam link to rotate in an opposite direction until drag link 44 and leg 43 are doubled over or parallel to each other, the wheel moving toward the rear of the fuselage as in the dotted lines of FIG. 2.

In the impact absorbing and scuff preventing portion of the landing gear a wheel carrying member or axle 46 is pivotally joined at a point, 47, intermediate its ends to the outer end of the oleo piston rod 24. The wheel carrying member is somewhat V-like in shape and has an obtuse angle formed between its legs. The outer end carries the landing wheel 16; whereas a scuff link 50 pivotally joins its inner end to the outer surface of oleo cylinder 18 by pivots 48 and 49, respectively. This construction enables the scuff link and wheel axle to move in a scissors fashion respective to each other with movement of the oleo piston rod 24 in and out of the cylinder as occasioned by the application and release of impact ground loads on the wheel 16. Instead of the wheel 16 sliding laterally away or toward the fuselage over the landing surface during this time and thereby causing tire scuffing, the scissors action causes the wheel to rotate partially on its sidewall, as shown by the various dotted wheel positions in FIG. 1, tipping laterally toward and away from the fuselage at its upper end and thus eliminating undesirable tire scuffing.

Although this invention has been described and illustrated in one preferred embodiment, obviously details of construction may be varied without departing from its spirit. The following claims are intended as determination of the invention's scope.

What is claimed is:

1. In an aircraft having a fuselage, a retractible landing gear comprising a shaft mounted in said fuselage and laterally thereof, an oleo strut including a cylinder and a piston rod projecting therefrom pivotally secured at one end of said cylinders to said shaft and extending outwardly and downwardly from said fuselage, a fixed pivot in said fuselage, an L-shaped cam pivotally mounted on said pivot and connected by one leg to said cylinder, a reverse powered actuator in said fuselage connected to the other leg of said cam for exerting a landing gear extending and retracting force, a stabilizing strut pivotally secured at one end to said shaft and secured at its other end to said cylinder, a wheel axle disposed laterally of said fuselage and pivotally secured intermediate its ends to said piston rod, a landing wheel mounted on the outer end of said axle, and a link pivotally secured by one of its ends to said cylinder and pivotally secured at its other end to the other end of said axle.

2. The device of claim 1 wherein said actuator is mounted on said shaft and including a link pivotally secured at its ends to said cylinder and to said other leg of said cam.

3. An aircraft landing gear comprising an oleo strut adapted to be mounted in a downwardly and outwardly direction from an aircraft fuselage in a first plane transversely of the fuselage axis having an oleo strut cylinder adapted to be secured at one end to said fuselage with a piston rod protruding from the other end thereof, an axle pivotally secured intermediate its ends to the protruding end of said piston rod and disposed in said first plane, a wheel mounted on the outer end of said axle for rotation in a second plane transversely to said first plane adapted to engage a landing surface, and a link disposed in said first plane pivotally secured at one of its ends to the inner end of said axle and pivotally secured at its other end to the outer surface of said oleo strut cylinder, so that said link and wheel axle move scissors fashion in said first plane respective to each other with reciprocal movement of said piston rod in and out of said cylinder as occasioned by application and release of loads through impact of said wheel with a landing surface and said wheel pivots about its point of engagement with the landing surface transversely of said first plane.

4. The device of claim 3 wherein said axle is V-like in shape having an obtuse angle between its legs and said piston rod is secured to it at a point outwardly of the junction between the legs.

References Cited in the file of this patent

UNITED STATES PATENTS

| | | |
|---|---|---|
| 2,157,963 | Mercier | May 9, 1939 |
| 2,346,010 | Cowey | Apr. 4, 1944 |
| 2,351,215 | Kleinhans et al. | June 13, 1944 |
| 2,661,171 | Allen | Dec. 1, 1953 |

FOREIGN PATENTS

| | | |
|---|---|---|
| 370,508 | Italy | Apr. 18, 1939 |
| 458,187 | Great Britain | Dec. 15, 1936 |